May 19, 1931. G. W. RUMMEL 1,805,676
AUTOMATIC TRAIN PIPE COUPLING
Filed Sept. 20, 1928
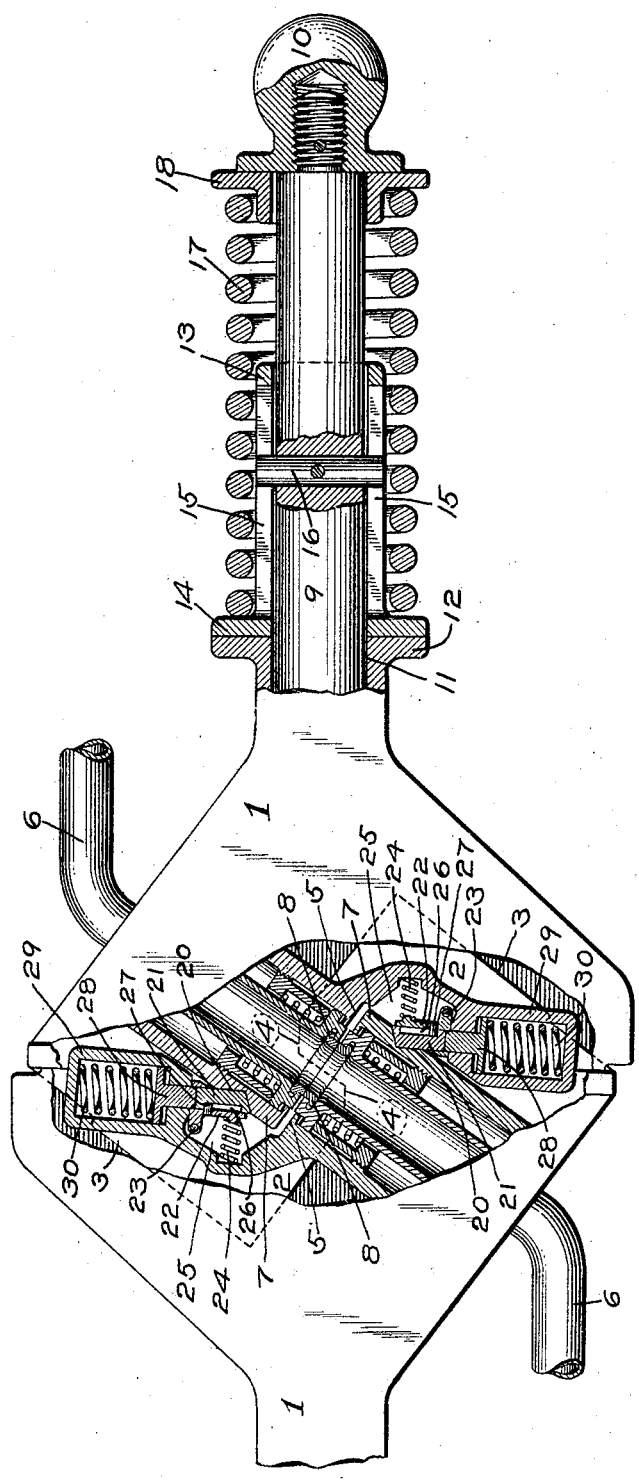
INVENTOR
GEORGE W. RUMMEL
BY *Wm. H. Cady*
ATTORNEY Patented May 19, 1931

1,805,676

UNITED STATES PATENT OFFICE

GEORGE W. RUMMEL, OF SWISSVALE, PENNSYLVANIA, ASSIGNOR TO THE WESTINGHOUSE AIR BRAKE COMPANY, OF WILMERDING, PENNSYLVANIA, A CORPORATION OF PENNSYLVANIA

AUTOMATIC TRAIN PIPE COUPLING

Application filed September 20, 1928. Serial No. 307,182.

This invention relates to automatic train pipe couplings, and more particularly to the type known as the tight or rigid lock coupling.

An object of the invention is to provide a train pipe coupling of the above mentioned type wherein the coupling heads will be automatically locked together when the cars are coupled.

Another object of the invention is to provide a train pipe coupling in which the interlocked coupling heads are secured together by means of slidably mounted latch members.

Another object of the invention is to provide a train pipe coupling of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a plan view, partly in section, of a train pipe coupling embodying the invention, showing the same operatively connected to a counterpart coupling.

Train pipe couplings of the type known as the tight or rigid lock coupling, are shown for example, in the Westinghouse Patent No. 708,747, dated September 9, 1902, and in which each coupling head is provided with a laterally projecting hook-shaped portion adapted to engage the corresponding portion of a counterpart coupling by a relative lateral movement, and be rigidly locked together by cam levers or latches, one pivoted upon each coupling head and bearing against the other counterpart coupling head. Train pipe passages are formed in the coupling heads and are provided with gaskets adapted to abut against corresponding gaskets of the counterpart coupling head when the two are connected together.

While a coupling of the above type will automatically couple with a counterpart coupling when two cars are brought together, it is necessary to manually operate the cam levers, when it is desired to uncouple, in order to release the locking of the coupling heads and thus permit the coupling heads to separate, when the cars are pulled apart.

By the present invention the coupling head is provided with a slidably mounted latch pin adapted to be automatically actuated to release the coupling when the cars are being uncoupled, as well as permit a quick interlock of the coupling head with a counterpart coupling when cars are being coupled.

Referring to the drawing, the automatic train pipe coupling head 1 comprises a projecting nose 2 adapted to engage in a recess 3 of a counterpart coupling head. The head 1 is provided with hooked portions 4 arranged above and below a plane surface 5, the hooked portion of one coupling head being adapted to engage and interlock with a corresponding hook portion of a counterpart coupling head, in the manner shown.

The plane surface 5 is provided with one or more openings for train pipe sections 6 which may be enclosed in a boss 7 formed as a part of the coupling head. The forward end of each train pipe section is provided with a gasket 8 adapted to engage the corresponding gasket on the other coupling, and make a fluid tight joint when the heads are coupled together.

The head 1 is slidably mounted on a stem 9 having its rear end provided with a ball section 10 adapted to be mounted in a socket (not shown) carried by the car. The forward end of the stem 9 extends through an opening 11 in the coupling head, and a flange 12 is formed at the rear end of the head.

Carried by the stem 9 is a sleeve 13 having one end flanged at 14 for abutting the flange 12. The sleeve 13 is formed with diametrically disposed longitudinal slots 15 into which the projecting ends of a pin 16 passed through the stem 9 extend.

A coil spring 17 encircles the stem 9 and the sleeve 13, one end of the spring bearing against the flange 14, while the opposite end thereof bears against a collar 18 at the inner end of the stem.

For the purpose of locking the coupling head when the same has been coupled to a counterpart coupling head, the boss 7 is formed with a V-shaped notch 20 adapted to receive the correspondingly formed nose of a pin 21 carried by a counterpart coupling head.

The pin is slidably mounted in a sleeve 22 pivoted at 23 to the coupling head, the sleeve and pin being pressed outwardly by an expansible coil spring 24 mounted in a recess 25 formed in the head 1. For the purpose of limiting the outward movement of the pin 21 with respect to the sleeve 22, the pin is formed with a longitudinal slot 26 into which projects a stud 27 carried by the sleeve.

The inner end of the pin 21 is engaged by the stem of a plunger 28 mounted in a cylinder 29 carried by the boss 7, the plunger being forced outwardly by pressure exerted by an expansible coil spring 30.

In operation, when cars are brought together for coupling up, the projecting nose 2 of one train pipe coupling enters the recess 3 of the counterpart coupling. The hooked portions 4 of the two couplings become interlocked through the relative lateral and longitudinal movement and the plane faces 5 are juxtaposed, so that the train pipe openings therein are connected together.

The end of the boss 7 will engage the extremity of the pin 21 and swing the same outwardly therefrom on the pivot 23, thereby compressing the spring 24. The nose of the pin 21 slides along the surface of the boss and when the hooked portions 4 interlock, the spring 24 forces the pin outwardly so that its nose enters the notch 20, the pin being also forced into the notch by the force exerted by spring 30 against plunger 29, thereby locking the two coupling heads tightly together.

During the coupling operation the coupling head 1 will be moved rearwardly on the stem 9 to an intermediate position, as shown in the drawing, and the spring 17 will be compressed between the flange 14 and collar 18 which are brought closer together.

When coupled cars are separated, the interlocked coupling heads 1 will be pulled outwardly on the stems 9 until further longitudinal movement is prevented by the pins 16 engaging the ends of the slots 15. When further outward movement of the heads relative to the stems is thus prevented, the continued pull will disengage the interlocked hooked portions 4 and the noses 2 will be withdrawn from the recesses 3.

When the heads commence to part, the boss 7 of one coupling head will force the pin 21 of the counterpart coupling head inwardly of its sleeve 22, thereby forcing the plunger 28 inwardly of the cylinder 29 and compressing the spring 30. In this way, the pin 21 will be disengaged from the notch 20, thereby permitting an unrestricted separation of the parts, immediately following the withdrawal of the nose 2 from the recess 3 the spring 30 will expand and in so doing it will return the pin 21 to its normal extended position ready for coupling up.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a train pipe coupling adapted to automatically couple with a counterpart coupling and having a nose adapted to engage a recess formed in the counterpart coupling, a pivotally mounted sleeve, a pin slidably mounted in the sleeve, and a spring pressed plunger for projecting the pin into engagement with the nose of a counterpart coupling and lock the same in coupled position.

2. The combination with a train pipe coupling adapted to automatically couple with a counterpart coupling and having a nose adapted to engage a recess formed in the counterpart coupling and a notch formed in said nose, of means for locking the coupling in coupled position comprising a sleeve hinged to the coupling for movement laterally thereof, and a pin mounted in the sleeve for movement longitudinally thereof, said pin being adapted to engage in the notch of the counterpart coupling when the couplings are brought together for coupling up.

3. The combination with a train pipe coupling adapted to automatically couple with a counterpart coupling and having a nose adapted to engage a recess formed in the counterpart coupling and a notch formed in said nose, of means for locking the coupling in coupled position comprising a sleeve hinged to the coupling for movement laterally thereof, a pin mounted in the sleeve for movement longitudinally thereof, and means acting on the sleeve for normally maintaining the pin in the path of the nose of the counterpart coupling.

4. The combination with a train pipe coupling adapted to automatically couple with a counterpart coupling and having a nose adapted to engage a recess formed in the counterpart coupling and a notch formed in said nose, of means for locking the coupling in coupled position comprising a sleeve hinged to the coupling for movement laterally thereof, a pin mounted in the sleeve for movement longitudinally thereof, a spring acting on the sleeve for normally maintaining the same in extended position, and a spring pressed plunger for projecting the pin into engagement with the notch of the counterpart coupling.

In testimony whereof I have hereunto set my hand, this 18th day of September, 1928.

GEORGE W. RUMMEL.